US009829131B2

(12) United States Patent
Cloos et al.

(10) Patent No.: US 9,829,131 B2
(45) Date of Patent: Nov. 28, 2017

(54) PIPE COUPLING CONSTRUCTION, AND COUPLING

(71) Applicant: Pipelife Nederland B.V., Enkhuizen (NL)

(72) Inventors: Peter Jeroen Cloos, Enkhuizen (NL); Jan Van Meegdenburg, Westwoud (NL)

(73) Assignee: Pipelife Nederland B.V., Enkhuizen (NL)

( * ) Notice: Subject to any disclaimer, the term of this patent is extended or adjusted under 35 U.S.C. 154(b) by 291 days.

(21) Appl. No.: 14/701,905

(22) Filed: May 1, 2015

(65) Prior Publication Data

US 2016/0319970 A1    Nov. 3, 2016

(51) Int. Cl.
*F16L 31/00* (2006.01)
*F16L 23/12* (2006.01)
*F16L 13/10* (2006.01)
*F16L 23/00* (2006.01)
*F16L 23/08* (2006.01)

(Continued)

(52) U.S. Cl.
CPC .............. *F16L 23/12* (2013.01); *F16L 9/14* (2013.01); *F16L 13/103* (2013.01); *F16L 23/006* (2013.01); *F16L 23/08* (2013.01); *F16L 33/01* (2013.01); *F16L 47/03* (2013.01); *B29C 65/342* (2013.01); *B29C 65/3476* (2013.01); *B29C 65/562* (2013.01); *B29C 65/72* (2013.01); *B29C 66/12821* (2013.01); *B29C 66/12841* (2013.01); *B29C 66/1312* (2013.01); *B29C 66/5221* (2013.01); *B29C 66/5344* (2013.01); *B29C 66/55* (2013.01); *B29C 66/71* (2013.01); *B29C 66/7212* (2013.01); *B29C 66/72141* (2013.01); *B29C 66/72321* (2013.01); *B29C 66/7392* (2013.01)

(58) Field of Classification Search
USPC ...................... 285/21.1, 21.2, 247, 248, 249, 285/222.1–222.5
See application file for complete search history.

(56) References Cited

U.S. PATENT DOCUMENTS 2,122,126 A * 6/1938 Barnard ................ F16L 33/003
                                                              285/222.4
4,033,612 A * 7/1977 Chevalier ............. F16L 11/083
                                                              285/222.4

(Continued)

FOREIGN PATENT DOCUMENTS

EP          2053297 A2    4/2009
WO         99/58894 A1   11/1999
WO      2011/053141 A1    5/2011

*Primary Examiner* — Aaron Dunwoody
(74) *Attorney, Agent, or Firm* — NLO. N.V.; Catherine A. Shultz

(57) ABSTRACT

A pipe coupling construction which can be used for coupling of a high-pressure pipe includes an inner bush of a non-metallic material and an outer bush, which bushes in axial section have parts which mesh with each other in order to transmit axial forces. The inner bush can be fused or adhered to an outer cover layer of the pipe. The coupling has a metal sleeve construction. The outer bush has an outer bush protruding end which protrudes with respect to the inner bush and the metal sleeve construction is at least partially located within the outer bush protruding end. The metal sleeve construction and outer bush in axial section have parts which mesh with each other.

20 Claims, 3 Drawing Sheets

(51) Int. Cl.
*F16L 9/14* (2006.01)
*F16L 33/01* (2006.01)
*F16L 47/03* (2006.01)
*B29C 65/34* (2006.01)
*B29C 65/00* (2006.01)
*B29C 65/56* (2006.01)
*B29C 65/72* (2006.01)

(56) References Cited

U.S. PATENT DOCUMENTS

| | | | |
|---|---|---|---|
| 8,276,620 B2 * | 10/2012 | Vo | F16L 11/08 138/109 |
| 8,944,471 B2 * | 2/2015 | Rodenburg | F16L 11/127 285/222.1 |
| 2009/0085351 A1 | 4/2009 | Cloos et al. | |
| 2009/0309356 A1 * | 12/2009 | Saltel | F16L 11/081 285/222.2 |
| 2013/0241197 A1 * | 9/2013 | Espinasse | F16L 33/01 285/222.1 |

* cited by examiner

PIPE COUPLING CONSTRUCTION, AND COUPLING

BACKGROUND OF THE INVENTION

The application is related to a pipe coupling construction. A pipe coupling construction is disclosed in US2009/0085351. The inner surface of this prior art pipe coupling construction may be completely made of a plastics material, including the inner liner of the pipe and the associated sealing element which protrudes at the outer end of the coupling. Thereby, the metal parts of the coupling are shielded from any aggressive substances in the fluids to be transported through the pipe, such as present in crude oil. Moreover, the pipe coupling construction is well equipped to cope with the high pressures at which crude oil is delivered from a well, having regard to the reinforcement layer in the plastic pipe and the metal sleeve construction and flange.

In the prior art pipe coupling construction, the coupling has fairly large outer dimensions, which result from the position of the coupling on the outside of the pipe. Said prior art coupling has a sleeve and flange which are integrated in one piece of metal material. The sleeve thereof is connected to the outer bush through a pair of additional shell halves, which grip around both the metal sleeve and the outer bush.

SUMMARY OF THE INVENTION

An object of the invention is to provide a pipe coupling construction which is less cumbersome. Another object is to provide a pipe coupling construction having relatively small dimensions. A further objective is to provide a pipe coupling construction which is more economic.

These and other objects are achieved in that an outer bush has an outer bush protruding end which protrudes with respect to an inner bush, in that the metal sleeve construction is located at least partially within the outer bush protruding end and in that the metal sleeve construction and outer bush in axial section have parts which mesh with each other.

The metal sleeve construction is accommodated inside the outer bush, in such a way that it is aligned with respect to the inner bush. As a result, force transfer from the pipe through the inner bush, outer bush and to the metal sleeve construction takes place in a more efficient and direct way. Consequently, the several components in the pipe coupling construction are exposed to less extreme loadings, resulting in a relatively low weight and low cost.

A sealing ring can be provided between the inner liner protruding end and the sealing element. The meshing parts of the bushes may be carried out in several ways. Said meshing parts can have a relatively steeply slanting surface and a relatively gently slanting surface, the relatively gently slanting surface of the inner bush facing away from the flange. This means that the inner bush, which consists of a plastic material, which by definition has a relatively low modulus of elasticity, is regularly loaded over the major part of its extension in longitudinal direction, which is obtained by the relatively long and gently sloping surfaces.

Similarly, the meshing parts of the outer bush protruding end and the metal sleeve construction may have several forms. Here as well, there can be meshing parts which have a relatively steeply slanting surface and a relatively gently slanting surface, the relatively gently slanting surface of the metal sleeve construction facing away from the flange. In this case, the relatively steep surfaces of the metal sleeve construction and of the outer bush carry the major load.

The sealing element can extend up to the free end of the metal sleeve construction. Thereby, the metal sleeve construction is completely protected against any fluid which is transported through the pipe. The sealing element may have a sealing element rim which at least partly covers the outer radial surface of the metal sleeve construction or the outer radial surface of the flange, said outer radial surface facing away from the pipe. The sealing element rim may also act as a gasket for sealing the pipe coupling construction with respect to an adjoining structure, such as a further pipe coupling construction or the flange of e.g. a vessel. The sealing element can comprise a non-metallic material, for example, a thermoplastic material, such as PA12.

The sealing element may have a nominal inner diameter and an inner recess having an inner recess diameter which is larger than the nominal diameter, in which recess the inner liner protruding end is accommodated, and wherein the nominal inner diameter of the sealing element is equal to the inner diameter of the pipe. As a result, the fluid flow through the pipe coupling construction may take place in an interrupted, smooth way without vortices occurring at the transition between the inner liner of the pipe and the sealing element of the pipe coupling.

With the aim of ascertaining the correct position of the pipe, the sealing element and the metal sleeve construction with respect to each other, the metal sleeve construction may have an internal metal sleeve flange which protrudes inwardly with respect to the inner surface of the metal sleeve construction, said internal metal sleeve flange having flange surfaces which face away from each other in axial direction, one of said flange surfaces facing, and possibly contacting, the outer cover layer and the reinforcement layer and the other flange surface facing, and possibly contacting, the sealing element. Furthermore, the metal sleeve construction and the inner bush may be directly connected to each other, e.g., through screw threads, though a press fitting etc.

The metal sleeve construction has an external rim at its end facing away from the pipe, with the flange abutting said external rim at the surface of said external rim which faces the pipe. As an alternative, the flange may be carried in unity with the metal sleeve construction.

The metal sleeve construction itself may also be carried out as a unitary piece of metal. Alternatively, the metal sleeve construction can comprise metal sleeves which overlap each other in axial direction and which are connected to each other through a screw/nut arrangement located at the overlapping parts of the metal sleeves. Such a construction can be helpful in assembling the pipe coupling construction. Other connections, such as a bayonet connection, a welded connection or a pressed connection and the like are envisaged as well. Thereby, it is possible to first of all connect one of the metal sleeves to the pipe, and to subsequently apply the other sleeve with the flange. Thus, it may be possible to form the outer bush by applying the outer bush by winding of a glass fibre material, as addressed below. This winding process is then not hampered by the presence of a flange, which otherwise would make the winding process cumbersome due to the circumstance that it protrudes considerably in radial direction.

For the purpose of enabling the outer sleeve to transfer the relatively high forces between the pipe and the coupling, said outer bush may comprise a glass fibre reinforced epoxy material. As mentioned, such an embodiment may be obtained by winding a glass fibre imbued in a liquid epoxy around the inner bush and the metal sleeve construction, as will be discussed further below. The outer bush may alternatively comprise a metal, such as steel. The inner bush may have electrical heating means for causing the inner bush material and the outer cover layer thermoplastic material to fuse or to adhere together. The inner bush may be injection moulded.

The invention is also related to a substructure for use in a coupling for a pipe coupling construction. The substructure can include an inner bush of a non-metallic material, an outer bush and a metal sleeve construction. The inner bush and the outer bush in axial section have parts which mesh with each other in order to transmit axial forces and the outer bush comprises an outer bush protruding end which protrudes with respect to the inner bush The metal sleeve construction is located at least partially within the outer bush protruding end, and the metal sleeve construction and outer bush in axial section have parts which mesh with each other.

The invention is also related to a method of forming a substructure for use in coupling pipes. The method includes connecting a non-metallic inner bush to an outer bush in order to permit transmittal of axial forces and such that the outer bush protrudes on an end with respect to the inner bush; and connecting a metal sleeve construction to an inside of the outer bush on the protruding end.

BRIEF DESCRIPTION OF THE SEVERAL VIEWS OF THE FIGURES

The invention will be described further with respect to embodiments shown in the drawings.

DETAILED DESCRIPTION

Figure 1:
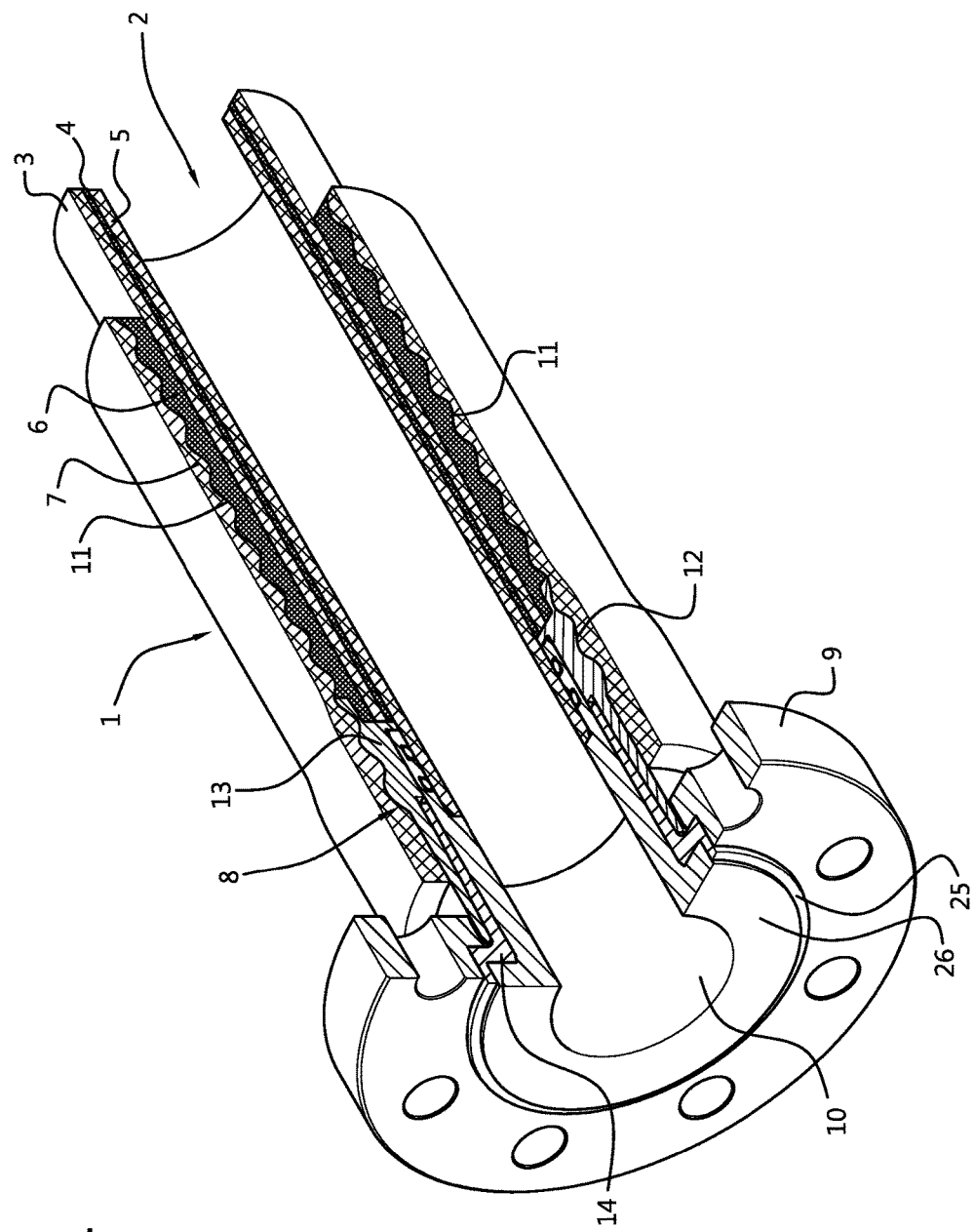
FIG. 1 shows a pipe coupling construction in perspective, partly taken away.
Figure 2:
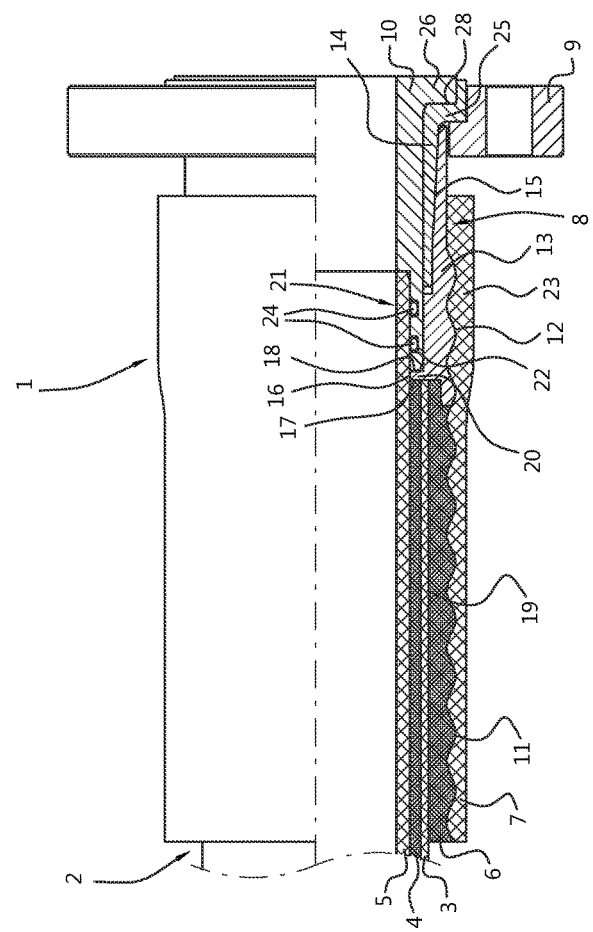
FIG. 2 shows a side view, partly in longitudinal section, of the pipe coupling construction.

The pipe coupling construction as shown in FIGS. 1 and 2 consists of the pipe 1 and the coupling construction 2. The pipe 1 has an outer cover layer 3, a reinforcement layer 4 and an inner liner 5. The coupling 2 has an inner bush 6, an outer bush 7 connected to the inner bush, a metal sleeve construction 8 connected to the outer bush 7, a flange 9 connected to the metal sleeve construction 8 and a sealing element 10 in the metal sleeve construction 8.

The inner bush has an electric heating wire 19 imbedded in its inner surface, which has been heated by applying an electric current so as to melt, fuse or adhere the inner bush 6 to the outer cover layer 3 of the pipe 2. The inner bush 6 and the outer bush 7 have meshing teeth 11 which are interlocked into each other. Also the metal sleeve construction 8 and the outer bush have meshing teeth 12.

The metal sleeve construction 8 consists of the outer metal sleeve 13 and the inner metal sleeve 14 which are connected to each other through screw threads 15. Alternative connections such as a bayonet connection, a welded connection or a pressed connection and the like are possible as well. Furthermore, the inner metal sleeve 14 has an inwardly protruding flange 16 having faces 17, 18 which face away from each other. The outer metal sleeve 13 has a ring 20 facing towards the inner bush 6 and surrounding the corresponding end of inner bush 6. The inner bush 6 and the outer metal sleeve 13 may be connected to each other in this area.

The inner liner 5 of the pipe 2 has a protruding inner liner end 21 which protrudes with respect to the reinforcement layer 4 and the outer cover layer 3 of the pipe 1. The sealing element 10 has an inner recess 22 at its end facing the pipe 1, into which the inner liner protruding end 21 of the pipe 1 has been snugly accommodated. By means of sealing rings 24, these parts have been sealed with respect to each other. As shown the end of the sealing element 10 rests against one of the faces 18 of the inner flange 16 of the metal sleeve construction 8; the reinforcement layer 4 and the outer cover layer 3 rest against the opposite face 17 of said inner flange 16.

The inner metal sleeve 14 of the metal sleeve construction 8 has an outer rim 25 against which the flange 9 is bearing. The sealing element 10 has an outer rim 26 which is accommodated in a recess 28 of the outer rim 25 of the inner metal sleeve 14, which outer rim 26 acts as a sealing element for sealing the pipe coupling construction with respect to an adjoining flange etc.

Although in FIGS. 1 and 2 the meshing teeth 11, 12 have an undulating, symmetric shape, any suitable other shape may be used as an alternative. For example, an asymmetric shape could be used. These teeth may have a relatively gently slanting surface facing the free end of the pipe coupling construction, and a relatively steeply slanting surface facing away from the free end of the pipe coupling construction. Thereby, especially at the location of the inner bush 6 which consists of a plastic material, the load to be transferred is distributed over relatively large surfaces. Although at the location of the metal outer sleeve 13 may have such shapes as well, other shapes are possible as well. The shape could be chosen due to the higher strength and stiffness of the metal material.

Figure 3:
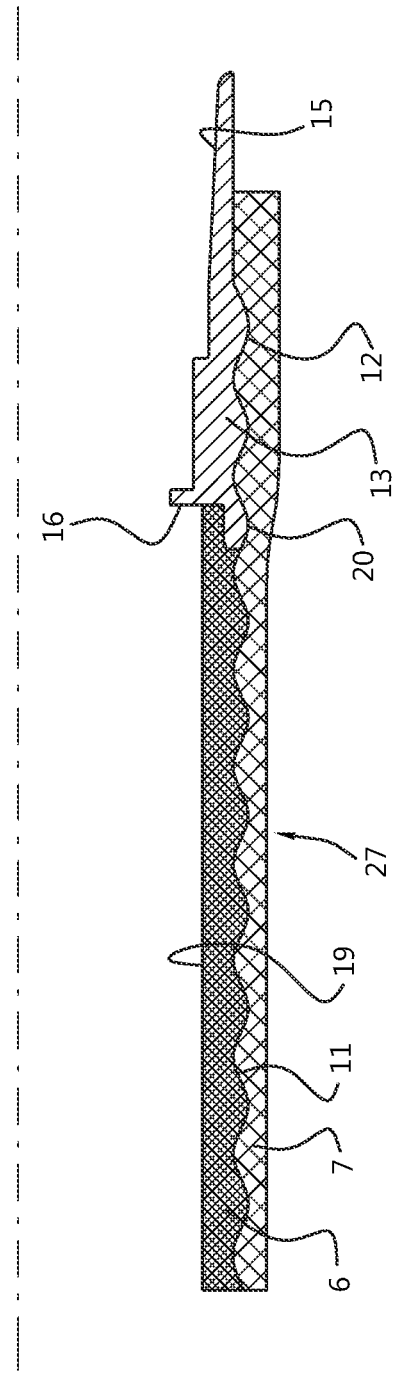
FIG. 3 shows a side view, partly in longitudinal section, of a substructure for the pipe coupling construction.

The substructure 27 according to FIG. 3 can be pre-assembled; it is applied around the pipe 2 in the position shown in FIGS. 1 and 2. Next, the inner metal sleeve 14 together with the flange 9 is screwed into the outer metal sleeve 13 by means of the screw thread 15. Subsequently, the sealing element 10 is slid into the inner metal sleeve 14, whereby the inner liner protruding end 21 is accommodated in the inner recess 22 of the sealing element 14 and the sealing rings 24 are compressed between these components so as to ascertain the liquid tightness. The outer flange 26 is then also fitted into the proper position against the outer flange 25 of the inner metal sleeve 14.

As discussed in the background, typical prior art pipe couplings have large dimensions and a number of different parts, including shell haves connecting the sleeve to the outer bushing. As a consequence of the several intricate metal parts, the prior art pipe coupling is not only cumbersome but also relatively expensive.

Furthermore, the shell halves which grip around the metal sleeve and the outer bush are in a relatively eccentric position with respect to the metal sleeve and outer bush, leading to a less efficient force transfer through the coupling. The eccentricity in the force transfer also adds to the relative weight of the pipe coupling construction.

The invention of the current application provides a pipe coupling construction which is less cumbersome, with smaller dimensions and more economic. This is achieved in that the outer bush has an outer bush protruding end which protrudes with respect to the inner bush, in that the metal sleeve construction is located at least partially within the outer bush protruding end and in that the metal sleeve construction and outer bush in axial section have parts which mesh with each other and the inner bush and outer bush in axial section have parts which mesh with each other. The metal sleeve construction is accommodated inside the outer bush, in such a way that it is aligned with respect to the inner bush. As a result, force transfer from the pipe through the inner bush, outer bush and to the metal sleeve construction takes place in a more efficient and direct way. Consequently, the several components in the pipe coupling construction are exposed to less extreme loadings, resulting in a relatively low weight and low cost.

LIST OF REFERENCE NUMERALS

1. Coupling
2. Pipe
3. Outer cover layer pipe
4. Reinforcement layer pipe
5. Inner liner pipe
6. Inner bush
7. Outer bush
8. Metal sleeve construction
9. Flange
10. Sealing element
11. Teeth inner bush and outer bush
12. Teeth outer bush and metal sleeve construction
13. Outer metal sleeve
14. Inner metal sleeve
15. Screw thread
16. Inwardly protruding flange of metal sleeve construction
17. Face of inwardly protruding flange
18. Face of inwardly protruding flange
19. Heating wire
20. Ring
21. Inner liner protruding end
22. Recess
23. Outer bush protruding end
24. Sealing ring
25. Outer rim metal sleeve construction
26. Outer rim sealing element
27. Substructure
28. Recess While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A pipe coupling construction comprising a coupling and a high-pressure pipe connected to said coupling, which high-pressure pipe comprises an outer cover layer of a non-metallic material, a reinforcement layer, and an internal liner, wherein the coupling comprises an inner bush of thermoplastic material and an outer bush, which inner and outer bushes in axial section have parts which mesh with each other in order to transmit axial forces, wherein the inner bush is fused or adhered to the outer cover layer of the pipe, a metal sleeve construction and a flange located at the metal sleeve construction end which faces away from the pipe, the metal sleeve construction being connected to the outer bush, and a sealing element, the inner liner having a protruding inner liner end which protrudes with respect to the outer cover layer and the reinforcement layer, wherein the sealing element surrounds the protruding inner liner end, wherein the sealing element extends over the inner surface of the metal sleeve construction, and wherein the outer bush has an outer bush protruding end which protrudes with respect to the inner bush, in that the metal sleeve construction is located within the outer bush protruding end and in that the metal sleeve construction and outer bush in axial section have parts which mesh with each other.

2. The pipe coupling construction according to claim 1, wherein a sealing ring is provided between the inner liner protruding end and the sealing element.

3. The pipe coupling construction according to claim 1, wherein the meshing parts of the bushes have a relatively steeply slanting surface and a relatively gently slanting surface, the relatively gently slanting surface of the inner bush facing away from the flange.

4. The pipe coupling according to claim 1, wherein the meshing parts of the outer bush protruding end and the metal sleeve construction have a relatively steeply slanting surface and a relatively gently slanting surface, the relatively gently slanting surface of the metal sleeve construction facing away from the flange.

5. The pipe coupling according to claim 1, wherein the sealing element extends up to a free end of the metal sleeve construction.

6. The pipe coupling construction according to claim 5, wherein the sealing element has a sealing element outer flange which at least partly covers the outer radial surface of the metal sleeve construction or the outer radial surface of the flange, said outer radial surface facing away from the pipe.

7. The pipe coupling construction according to claim 5, wherein the sealing element has a nominal inner diameter and an inner recess having an inner recess diameter which is larger than the nominal diameter, in which inner recess the inner liner protruding end is accommodated, and wherein the nominal inner diameter of the sealing element is equal to the inner diameter of the pipe.

8. The pipe coupling according to claim 1, wherein the metal sleeve construction has an internal metal sleeve flange which protrudes inwardly with respect to the inner surface of the metal sleeve construction, said internal metal sleeve flange having flange surfaces which face away from each other in axial direction, one of said flange surfaces facing the outer cover layer and the reinforcement layer and the other flange surface facing the sealing element.

9. The pipe coupling construction according to claim 1, wherein the metal sleeve construction and the inner bush are directly connected to each other.

10. The pipe coupling construction according to claim 1, wherein the metal sleeve construction has an outer rim at an end facing away from the pipe, the flange abutting said outer rim at the surface of said outer rim which faces the pipe.

11. The pipe coupling construction according to claim 1, wherein the metal sleeve construction comprises metal sleeves which overlap each other in axial direction and which are connected to each other at the overlapping parts of the metal sleeves.

12. The pipe coupling construction of claim 11, wherein the connection is through a screw/nut arrangement or a bayonet arrangement.

13. The pipe coupling construction according to claim 1, wherein the outer bush comprises a glass fibre reinforced epoxy material.

14. The pipe coupling construction according to claim 1, wherein the inner bush comprises electrical heating means for causing the inner bush material and the outer cover layer thermoplastic material to fuse or to adhere together.

15. A substructure for use in a coupling for a pipe coupling construction, the substructure comprising: an inner bush of a non-metallic material; an outer bush, wherein the inner and outer bushes in axial section have parts which mesh with each other in order to transmit axial forces; and a metal sleeve construction connected to the outer bush; wherein the outer bush comprises an outer bush protruding end which protrudes with respect to the inner bush, wherein the metal sleeve construction is at least partially located within the outer bush protruding end, and wherein the metal sleeve construction and outer bush in axial section have parts which mesh with each other.

16. The substructure of claim 15, wherein the inner bush comprises means for being fused or adhered to an outer layer of the pipe.

17. The substructure of claim 15, wherein the metal sleeve construction comprises a metal outer sleeve which connects to the outer bush protruding end.

18. A method of forming a substructure for use in coupling pipes, the method comprising: connecting a non-metallic inner bush to an outer bush in order to permit transmittal of axial forces and such that the outer bush protrudes on an end with respect to the inner bush; and connecting a metal sleeve construction to an inside of the outer bush on the protruding end, wherein the inner and outer bushes in axial section have parts which mesh with each other in order to transmit axial forces; wherein the metal sleeve construction is at least partially located within the outer bush protruding end, and wherein the metal sleeve construction and outer bush in axial section have parts which mesh with each other.

19. The method of claim 18, wherein the connecting of the non-metallic inner bush and the outer bush comprises connecting with meshing parts.

20. The method of claim 18, wherein the connecting of a metal sleeve construction to an inside of the outer bush on the protruding end comprises connecting with meshing parts.

* * * * *